United States Patent [19]

Eckendorff

[11] Patent Number: 4,624,596
[45] Date of Patent: Nov. 25, 1986

[54] DEVICE FOR ADJUSTING THE ANGULAR POSITION OF A DRIVING MEMBER COUPLED TO ANOTHER DRIVEN MEMBER ADAPTED TO BE ROTATINGLY DRIVEN

[76] Inventor: Jean P. Eckendorff, 29 rue Aristide Briand, 27007-Evreux, France

[21] Appl. No.: 689,009

[22] Filed: Jan. 4, 1985

[30] Foreign Application Priority Data

Jan. 6, 1984 [FR] France ................... 84 00170

[51] Int. Cl.$^4$ .................. F16B 12/04; F16B 2/14
[52] U.S. Cl. .................... 403/4; 403/259; 403/374
[58] Field of Search .......... 403/4, 259, 359, 1, 403/118, 365, 374; 74/99 A, 99 R

[56] References Cited

U.S. PATENT DOCUMENTS

| | | | |
|---|---|---|---|
| 1,511,910 | 10/1924 | Royce | 403/4 |
| 1,903,162 | 3/1933 | Baur et al. | |
| 1,922,596 | 8/1933 | Mangold | |
| 2,443,688 | 6/1948 | McFarland | 403/359 |
| 2,785,550 | 3/1957 | Petrie | 403/359 |
| 2,978,276 | 4/1961 | Huffman | 403/365 |
| 3,819,289 | 6/1974 | Carroll | 403/259 |
| 4,292,001 | 9/1981 | Snell | 403/359 |
| 4,306,466 | 12/1981 | Coveney | 403/259 |

FOREIGN PATENT DOCUMENTS

| | | |
|---|---|---|
| 295246 | 12/1971 | Austria . |
| 900505 | 12/1953 | Fed. Rep. of Germany . |
| 997670 | 1/1952 | France . |
| 509508 | 7/1939 | United Kingdom . |

Primary Examiner—Cornelius J. Husar
Assistant Examiner—Peter M. Cuomo
Attorney, Agent, or Firm—Charles E. Brown; Charles A. Brown

[57] ABSTRACT

A device comprising a ring coupled on its inside surface to a steering shaft and coupled on its outside surface to a member such as the hub of a steering wheel, the ring being adapted to be displaced in translation by means of a control member, at least one of the couplings being adapted to determine in addition to translation of the ring angular displacement of the hub relative to the steering column, the control member comprising a screw with its axis parallel to the rotation axes of the members and which, by cooperation with the ring on the one hand and the hub on the other hand, is adapted to bring about translation of the ring by virtue of commanded rotation.

16 Claims, 13 Drawing Figures

DEVICE FOR ADJUSTING THE ANGULAR POSITION OF A DRIVING MEMBER COUPLED TO ANOTHER DRIVEN MEMBER ADAPTED TO BE ROTATINGLY DRIVEN

The present invention concerns a device for adjusting the angular position of a member constrained to rotate with another member, for example an automobile vehicle steering wheel fitted to a steering shaft.

At present there are known devices comprising two coupled shafts in which the angular position of one shaft may be modified relative to the other.

This is the case in Pat. No. GB-A- 509 508 (ELLIOT) in which a driving shaft is coupled to a driven shaft by means of an intermediate device essentially comprising an external sleeve fastened to the driven shaft, this sleeve comprising internal oblique splines adapted to cooperate with complementary splines formed on the periphery of two annular blocks themselves having—on their inside surface—splines adapted to cooperates with complementary splines provided on the end part of the driving shaft. A spring disposed between the blocks ensures the securing together of said shafts, by virtue of a wedging effect.

To modify the angular position of the driven shaft, a member associated with the blocks is actuated in translation so as to overcome the wedging effect and permit angular adjustment of the driven shaft.

It is observed that an arrangement of this kind is more particularly intended to permit the adjustment of a magneto in operation.

The foregoing applies equally to Pat. No. At-A-295 246, which teaches a device for adjusting the injection flowrate for internal combustion engines, a device of this kind essentially comprising a driving shaft and a driven shaft which are coupled by means of a sliding sleeve which meshes with the driving shaft through internal teeth and with corresponding teeth formed within a tubular extension through oblique outside teeth.

The modification of the angular position of the driven shaft is obtained by displacing the sliding sleeve in translation.

It is noted that the above arrangements offer the possibility of modifying the angular position of one member coupled to another in a "floating" manner.

It is understood that "floating" assemblies of this kind are not subject to major loads and moreover that the risk of accident in the event of misadjustment or deterioration is limited.

In the matter of the possibility for adjusting the angular position of a steering wheel on a steering shaft, it is readily understood that the fitting together of the members in question cannot be floating, but that on the contrary it must have mechanical characteristics capable of responding with complete safety to continuous loads and stresses.

In a manner which is well known, automobile vehicle steering wheels comprising a ring and a hub routinely joined by a number of radial spokes which, more often than not, extend substantially along the diameter of the ring.

It is known that the steering wheel is constrained to rotate with a free end part of the steering shaft by means of splines formed on an end section of the steering shaft with which are interlocked corresponding splines formed in a bore in the hub which further comprises a frustoconical surface adapted to cooperate with a frustoconical surface on the steering shaft. The axial fastening of the steering wheel to the steering shaft is achieved by means of a nut which cannot be undone once it has been done up screwed onto the end of the steering shaft and a washer disposed between a front surface of the hub and the aforementioned nut.

The steering wheel is usually fitted to the steering shaft after the various adjustments to the front axle assembly of the vehicle have been completed.

As the front axle assembly is adjusted after fitting the steering bar and the steering shaft associated with it, the adjustments affect the steering shaft, which rotates around its axis to a greater or lesser extent. It is understood that following this the splines which the steering shaft comprises are not, in the majority of cases, angularly positioned to permit the steering wheel to be fitted in such a way that its spokes are perfectly horizontal.

In order to minimize the inclination of the spokes in question, it has been proposed to increase the number of splines. The number of splines provided on the steering shaft is routinely 40; the same applies to the hub, of course, so that after adjustment of the steering wheel the spokes may be perfectly horizontal, which is extremely rare, or inclined at an angle of up to $4\frac{1}{2}°$ in the worst case adjustment, according to the most nearly aligned splines.

To return the steering wheel to the horizontal, it is possible to adjust the front axle assembly but this technique requires a certain time: it also requires skilled personnal and appropriate tools for carrying out the adjustment, and checking apparatus, with the result that the user, generally speaking, does not carry out such operations.

The inclination of the steering wheel spokes, however great or small it may be, is disagreeable for the driver, who cannot comfortably hold the steering wheel by its spokes, especially for motorway driving, not to mention the aesthetic result, which leaves something to be desired.

The present invention is directed towards remedying the disadvantages described hereinabove by means of a device which is simple to implement and fit and is adapted to adjust in a progressive manner the angular position of one member constrained to rotate with another member, such as for example an automobile steering wheel keyed to a steering shaft, a roller constrained to rotate with a drive shaft, etc . . . .

A device in accordance with the invention for adjusting the angular position of a driving member coupled to a driven member, which members are adapted to be driven in rotation, comprising a ring disposed between said members and the inside and outside surfaces of which comprise respective splined means adapted to cooperate with complementary means which said members comprise so as to form two couplings, one at least of the latter having helical splines and said ring being associated with translation control means whereby translational displacement of the ring entrains angular displacement of one of the members, characterized in that the control means comprise a screw whose axis is parallel to the rotation axes of the members and which, by cooperating with the ring on the one hand and the hub on the other hand, is adapted to bring about translation of the ring by virtue of commanded rotation, the member carrying the ring advantageously being a automobile vehicle steering shaft whereas the other member forms the hub of the steering wheel fitted to said shaft, said members comprising respective frustoconical bearing surfaces adapted to cooperate with one another.

By virtue of the device in accordance with the invention, the steering wheel may be offered up, for fastening it to the steering shaft, in an approximate manner, with the spokes nearly horizontal, the latter then being easily adjusted horizontally by simple action on the control screw, before locking the steering wheel to the steering shaft.

Other characteristics and advantages of the present invention will moreover emerge from the following description given by way of example with reference to the accompanying drawings in which.

Figure 1:
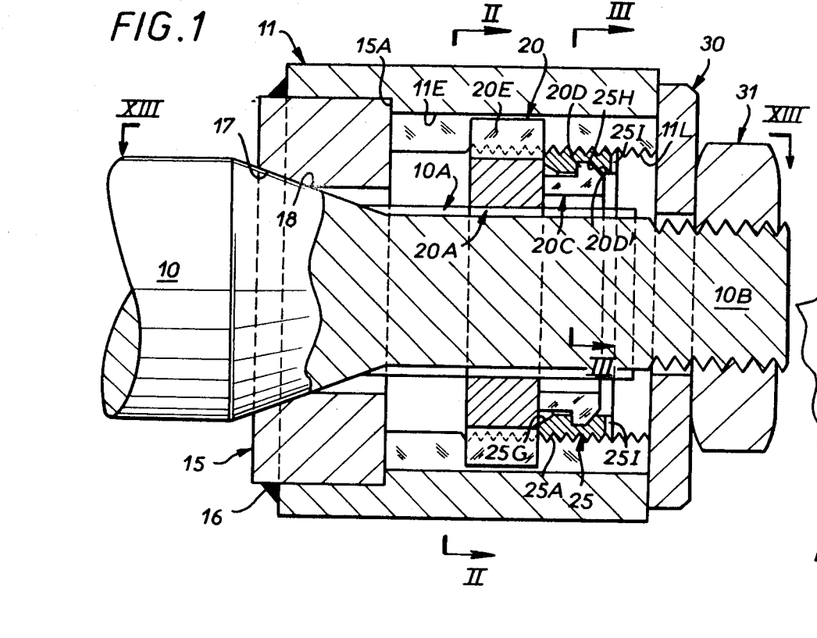
FIG. 1 shows in longitudinal cross-section one preferred embodiment of a device in accordance with the invention for adjusting the angular position of an automobile vehicle steering wheel fitted to a steering shaft.
Figure 2:
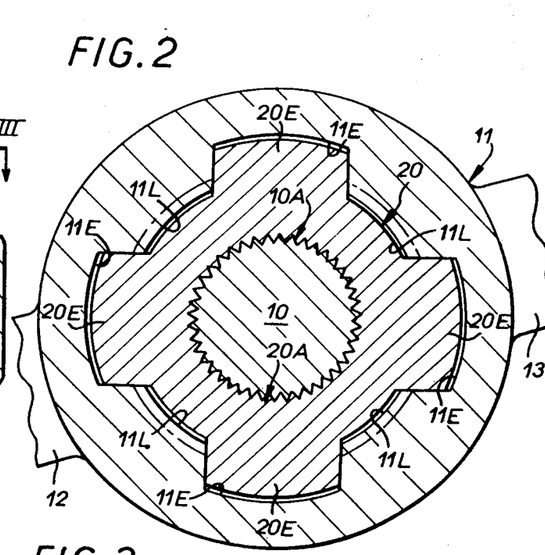
FIG. 2 is a view in transverse cross-section on the line II—II in FIG. 1.
Figure 3:
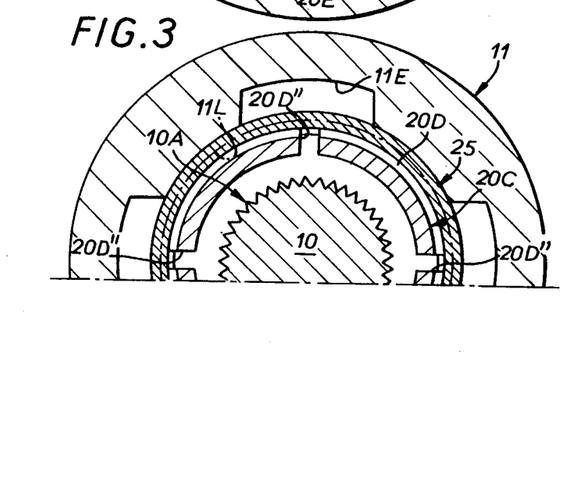
FIG. 3 is a partial view analogous to the preceding view, on the line III—III in FIG. 1.

In one preferred embodiment of the invention shown by FIGS. 1 through 3, the free end part of the steering shaft is designated 10, the hub 11 of the steering wheel, having, for example, two diametral spokes 12, 13, partially shown in FIG. 2, which are joined to the ring of the steering wheel, not shown here.

The free end part of the steering shaft 10 comprises, in the usual manner, a frustoconical surface 18 extended by a surface provided with straight splines 10A (40 in number, for example, regularly distributed over its periphery) itself extended by a threaded section 10B.

The hub 11 of the steering wheel is equipped at one end with a ring 15 in abutting relationship with a shoulder 15A and which is fastened to the hub by a weld 16. The ring 15 in question features a frustoconical inside surface 17 adapted to cooperate with the frustoconical surface 18 formed on the steering shaft 10.

The hub 11 comprises on its inside surface at least one but preferably a series of recessed helical splines 11E adapted to receive a series of projecting ribs 20E formed on the outside surface of a ring 20, the inside surface of which features splines 20A adapted to interlock over the corresponding splines 10A which the steering shaft 10 comprises.

The ring 20, which is in this way disposed between the steering shaft 10 and the hub 11, comprises on one surface an annular collar 20C having a peripheral shoulder 20D, a ramp surface 20D' at its end and a plurality of radial slots 20D" intended to confer on the collar the ability to deform elastically so as to permit the control screw 25 to be fitted to the ring 20 snap-fastener fashion.

A control screw 25 of this kind is annular and coaxial with said members, steering shaft hub; it comprises on its outside surface a thread 25A corresponding to a thread 11L formed on the inside surface of the hub 11 between the aforementioned helical splines, so that the splines of the hub have a two-fold function, namely: variation of the angular position of the ring conjointly with axial displacement of the screw. On its inside surface the annular screw 25 features an inclined inlet surface 25G and a groove 25H adapted to cooperate with the shoulder 20D which the collar 20C of the ring 20 comprises.

It is understood that the control screw 25 may easily be fitted to the ring 20 snap-fastener fashion and held firmly onto the latter, in particular by virtue of the impossibility of radial expansion of the screw 25 after insertion into the hub.

For the purposes of rotating it the control screw 25 features on its end surface a plurality of angularly offset impressions 25I, three in number for example, for receiving an appropriate tool.

It is readily understood that rotation of the control screw 25 prior to final locking of the hub onto the steering shaft 10 results in displacement of the ring 20 in translation and consequently the entrainment in rotation of the hub 11 of the steering wheel the spokes of which may be positioned perfectly horizontal subsequently to adjustment of the various component parts of the steering gear of the vehicle.

It is also noted that, between the projecting splines 20E, the diameter of the ring 20 is less than the diameter of the thread 11L, so as not to damage the latter.

After adjustment, the steering wheel is locked to the steering shaft by fitting a plate 30 on which bears a nut 31 which cannot be undone once it has been done up.

As an alternative, there could be provided a spring disposed between the ring 20 and the ring 15, the control screw 25 cooperating with the ring 20 by simple contact engagement.

It will be seen that in an embodiment of this kind, the control screw 25 being annular, the thrust which the latter exerts on the ring 20 is the same at all points, avoiding the risk of jamming.

Moreover, the splines provided on the steering shaft, being straight, permit optimum offering up of the steering wheel prior to adjustment, while the steering wheel and the ring-screw assembly form a combination which can be assembled easily.

Figures 4, 5, 6:
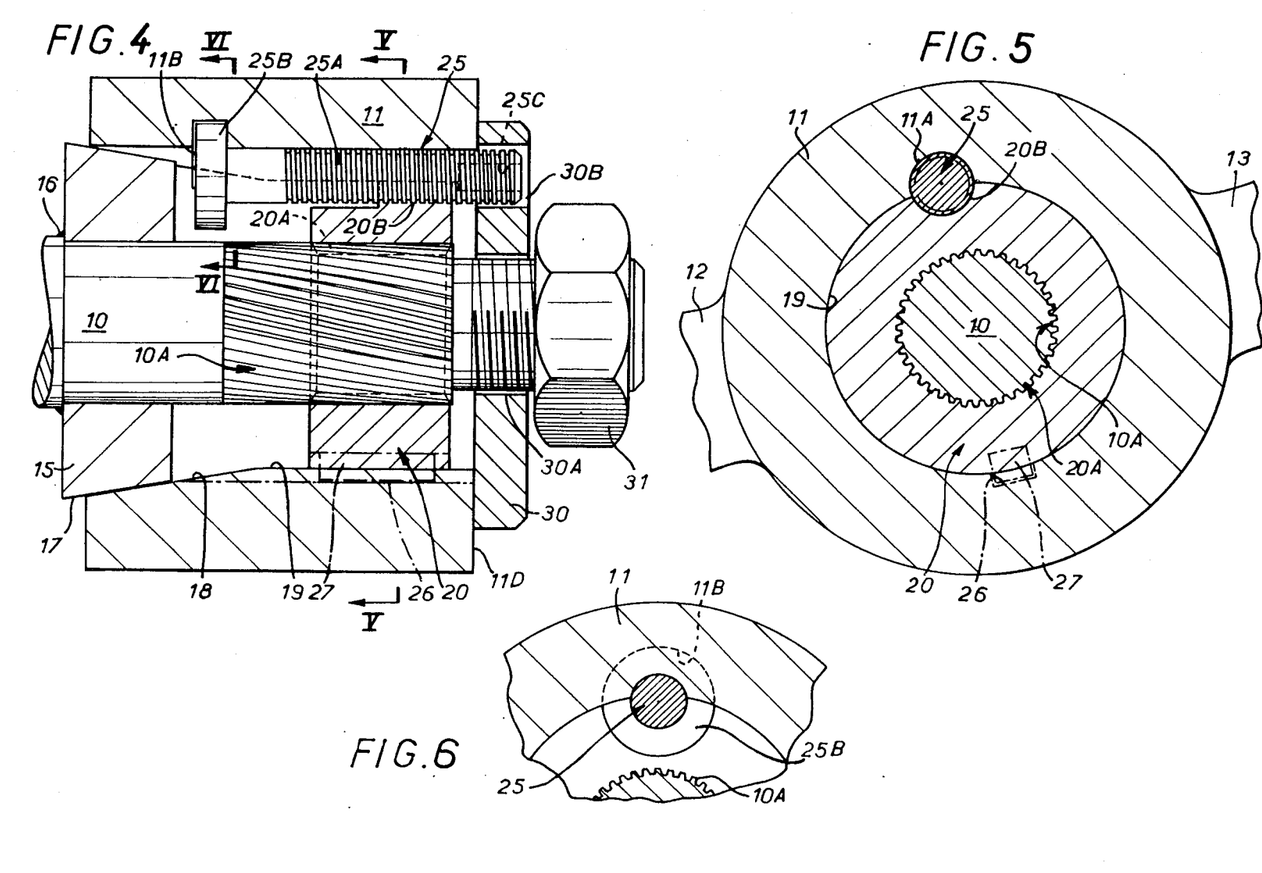
FIG. 4 shows in longitudinal cross-section the end part of a steering shaft equipped with a device in accordance with the invention for adjusting the angular position of an automobile vehicle steering wheel keyed to a steering shaft.
FIG. 5 is a view in cross-section on the line V—V in FIG. 4, the steering wheel hub being shown before angular adjustment.
FIG. 6 is a view in cross-section on the line VI—VI in FIG. 4.

According to another embodiment of the invention shown in FIGS. 4 through 8, the free end part of the steering shaft is designated 10 and the steering wheel hub 11, whence originate for example two diametral spokes 12, 13 partially shown in FIG. 5 which are joined to the ring of the steering wheel, not shown in the drawings.

To the steering shaft 10 there is fastened, as by a weld 16 for example, a ring 15 which features a frustoconical outside surface 17 adapted to cooperate with a complementary frustoconical surface 18 formed in a bore 19 which the hub 11 comprises.

The steering shaft 10 is constrained to rotate with the hub 11 with the possibility for progressive angular adjustment of the hub (and thus of the steering wheel) before locking of the latter.

In this embodiment the ring, generally designated 20, features on its inside surface means for coupling it to the steering shaft 10 which means, as shown, are constituted by helical splines 20A formed on the inside surface of the ring and by complementary splines 10A formed on an end section of the steering shaft. The aforementioned helical splines have a pitch which, given the translation of the ring 20, permits at least a minimum angular progressive displacement corresponding to the pitch of two consecutive splines.

The ring 20 is coupled to the hub 11 via its outside surface; as shown in FIGS. 4 through 8, the coupling is implemented by a screw 25 simultaneously forming a key and translation control means for the ring 20, this screw being inserted into a space formed between the outside surface of the ring and the inside surface of the hub. To this end, the outside surface of the ring 20 is prepared in such a way as to form a first semi-cylindrical longitudinal housing 20B comprising a thread whereas the internal surface 19 of the hub 11 is prepared in such a way as to form a second semi-cylindrical longitudinal housing 11A; the two semi-cylindrical housings, being placed face-to-face, receive without transverse clearance a screw 25 featuring a threaded shank 25A the pitch of which corresponds to that of the thread formed in the cylindrical half-housing 20B and a head 25B which immobilizes it in the axial direction by engaging in a groove 11B in the hub 11.

For rotating it, the end of the screw 25 opposite its head comprises a blind hole 25C the cross-section of which may be polygonal, for example hexagonal, square, triangular or oblong, etc . . . with the objective of preventing it being operated other than by an operator having the appropriate tool.

A clamping plate 30 comprising a central passage 30A and a radial passage 30B for receiving the free end of the screw 25 is engaged over the steering shaft 10, bearing on a front surface 11D of the hub, whereas a nut 31 which cannot be undone once it has been done up locks the hub 11 by wedging the respective frustoconical surfaces 17, 18.

The thread of the threaded section 25A of the screw 25 is advantageously trapezoidal, as is likewise, of course, the thread formed in the semi-cylindrical housing 20B, a thread of this kind not necessarily extending over all the length of said housing, but over a part of the latter.

On assembly, before doing up the nut 31, when the operator notes that the spokes 12, 13 of the steering wheel are not perfectly horizontal, it is easy for him to adjust them progressively to the correct position, by turning the screw 25, the effect of which is to move the ring 20 in translation over the steering column 10; given the helical splined coupling, this translation displacement of the ring 20 entrains rotation of the hub 11 and, therefore, the steering wheel.

Figure 7:
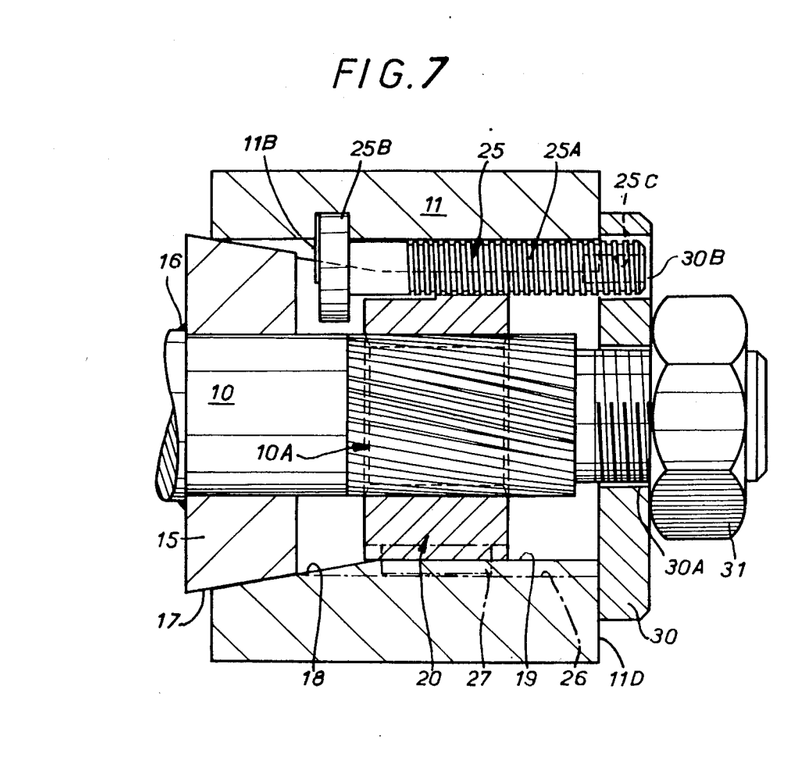
FIGS. 7 and 8 are views analogous to FIGS. 4 and 5 showing the hub of the steering wheel after adjustment.
Figure 8:
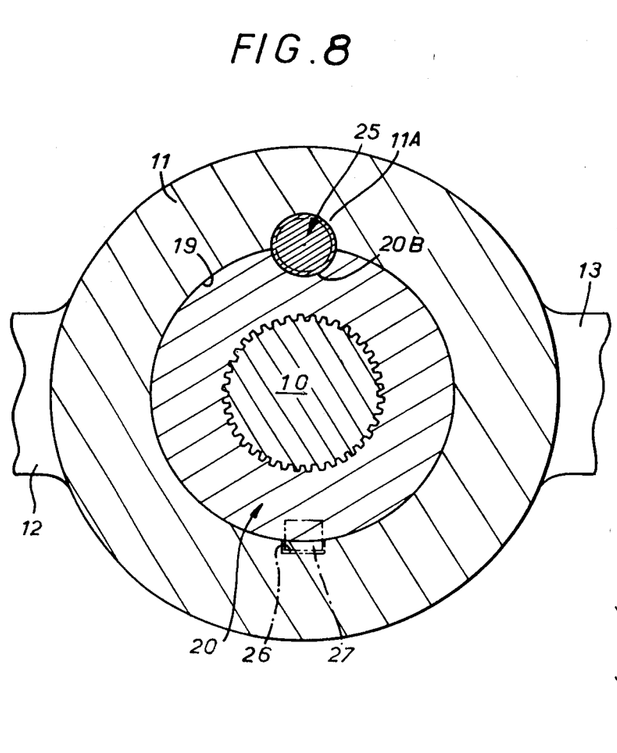

It is therefore possible for the operator to bring the spokes 12, 13 of the steering wheel into the correct position as shown in FIGS. 7 and 8 by progressive angular displacement of the hub of the steering wheel relative to the steering shaft.

The coupling of the ring 20 to the hub 11 may advantageously be complemented by a second key preferably disposed in a direction diametral to the screw 25 forming a control member and a key; as shown in chain-dotted line in FIGS. 4 through 8, the inside surface of the hub comprises a straight groove 26 whereas the outside surface of the ring comprises a key 27 adapted to slide in the aforementioned groove.

Figure 9:
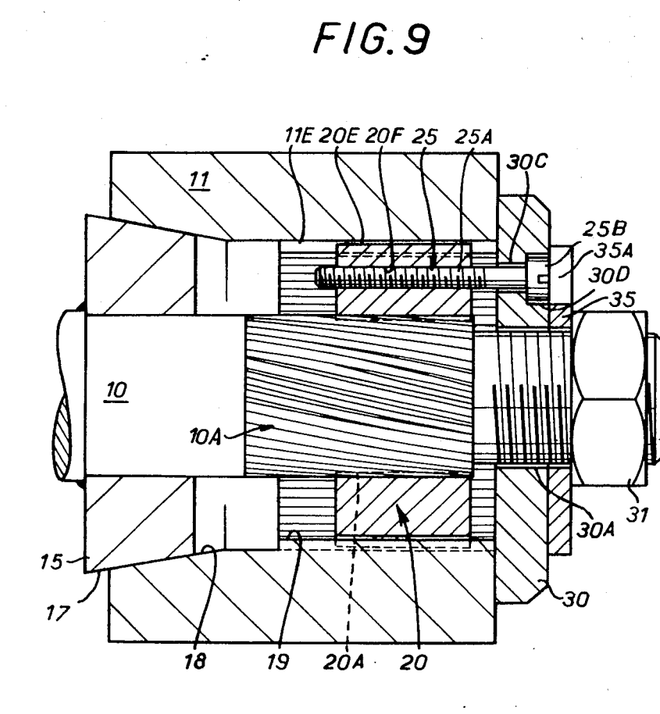
FIG. 9 is a view analogous to to FIG. 4 of another embodiment of the device in accordance with the present invention.

In another embodiment shown in FIG. 9, for which the same references have been used again to designate components previously described, it is seen that the coupling of the ring 20 to the steering shaft 10 is similar to that described and shown in FIGS. 4 through 8 (helical splines 10A, 20A); on the other hand, in this embodiment, the outside surface of the ring 20 comprises at least one rib adapted to cooperate with a complementary spline formed on the inside surface 19 of the hub 11. As shown, the outside surface of the ring 20 comprises straight splines 20E adapted to cooperate with corresponding splines 11E formed on the inside surface 19 of the hub 11.

For displacement of the ring 20 in translation over the steering column, the body of the ring 20 comprises a longitudinal thread 20F in which there is engaged a screw 25 passing through the clamping plate 30 by virtue of a passage 30C; the head 25B of the screw 25 is advantageously inserted in and bears against a housing 30D formed to this end in the plate, and the screw is preferably immobilized longitudinally by a restraining system such as a washer 35 comprising on its perimeter a notch 35A adapted to permit access to the head 25B of the screw 25.

As in the preceding embodiment, progressive adjustment of the angular position of the hub 11, and consequently of the steering wheel, relative to the steering shaft 10 is obtained by rotation of the screw 25 causing translation of the ring 20 along the steering column and, simultaneously, angular displacement of said ring, the latter thereby entraining the hub 11, the adjustment being, of course, carried out prior to locking of the hub onto the column by the nut 31 which cannot be undone once it has been done up.

Figure 10:
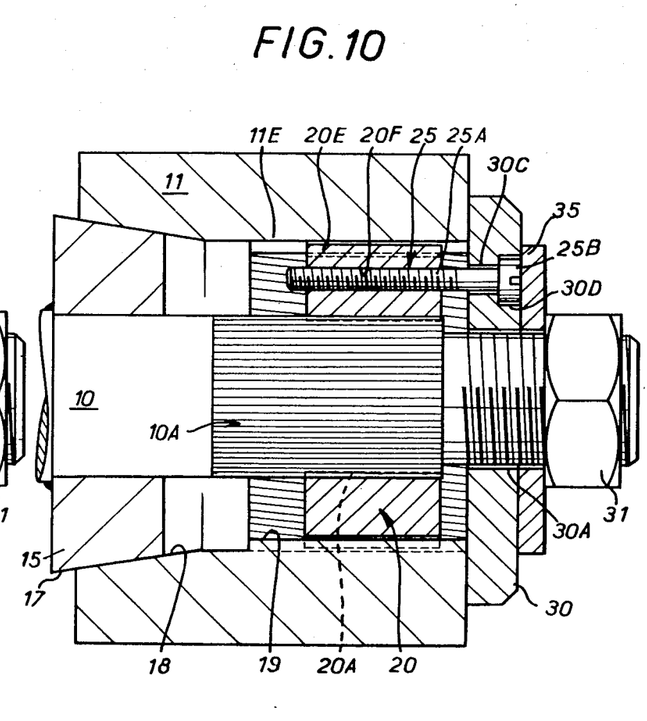
FIG. 10 shows another embodiment of the device in accordance with the invention derived from the preceding embodiments.

In another embodiment shown in FIG. 10, the same components are found as in the embodiment described and shown in FIG. 9 except that the coupling of the ring 20 to the steering shaft 10 is implemented by means of straight splines 10A, 20A whereas the coupling of the ring 20 to the hub 11 is implemented by means of helical splines 11E, 20E respectively formed on the inside surface 19 of the hub 11 and on the outside surface of the ring 20.

As in the preceding embodiments, progressive adjustment of the angular position of the hub 20 is obtained by turning the screw 25, before locking the hub 11, the frustoconical surfaces 17, 18 being simply in contact with one another, whereby the adjustment is achieved virtually without axial displacement of the hub relative to the steering shaft.

Figure 11:
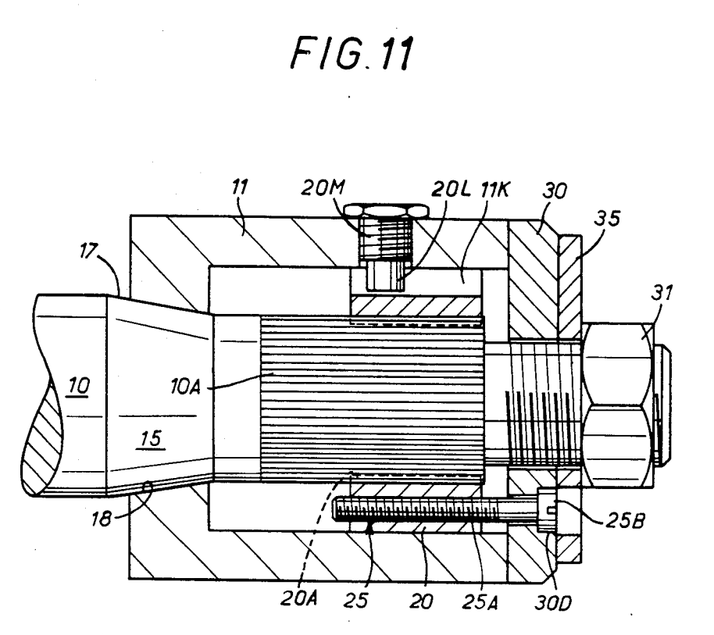
FIGS. 11 and 12 show two further embodiments.

In yet another embodiment shown in FIG. 11, the coupling of the ring 20 to the steering shaft 10 is implemented by means of straight splines 10A formed on the outside surface of the steering shaft meshing with corresponding splines 20A formed on the inside surface of the ring, whereas the coupling of the ring 20 to the hub comprises a helical spline 11K formed on the outside surface of the ring, this spline being adapted to slide on at least one stud 20L projecting above the inside surface of the hub. As shown, the stud constitutes the end of a radial screw 20M carried by the hub, preferably diametrally opposite the adjustment screw 25G.

In this embodiment, the hub 11 comprises a frustoconical surface bore 18 adapted to cooperate with a frustoconical surface 17 provided on the steering column.

In the foregoing there has been considered by way of example a steering wheel of the type comprising a ring connected to the hub by two diametral spokes, in the most common arrangement; however it will be understood that a device in accordance with the invention may equally well be used to adjust the angular position of all other types of steering wheel.

As previously, after unscrewing the nut 31 it is possible to turn the hub 11 around the steering shaft 10, displacing the ring 20 in translation by means of the control screw 25.

It will be seen that a device in accordance with the invention makes it possible to achieve perfect adjustment of the angular position of the steering wheel on the steering shaft, either at the time of fitting the steering wheel or subsequently and without any effect on previous adjustment to the front axle assembly of the vehicle.

Figure 12:
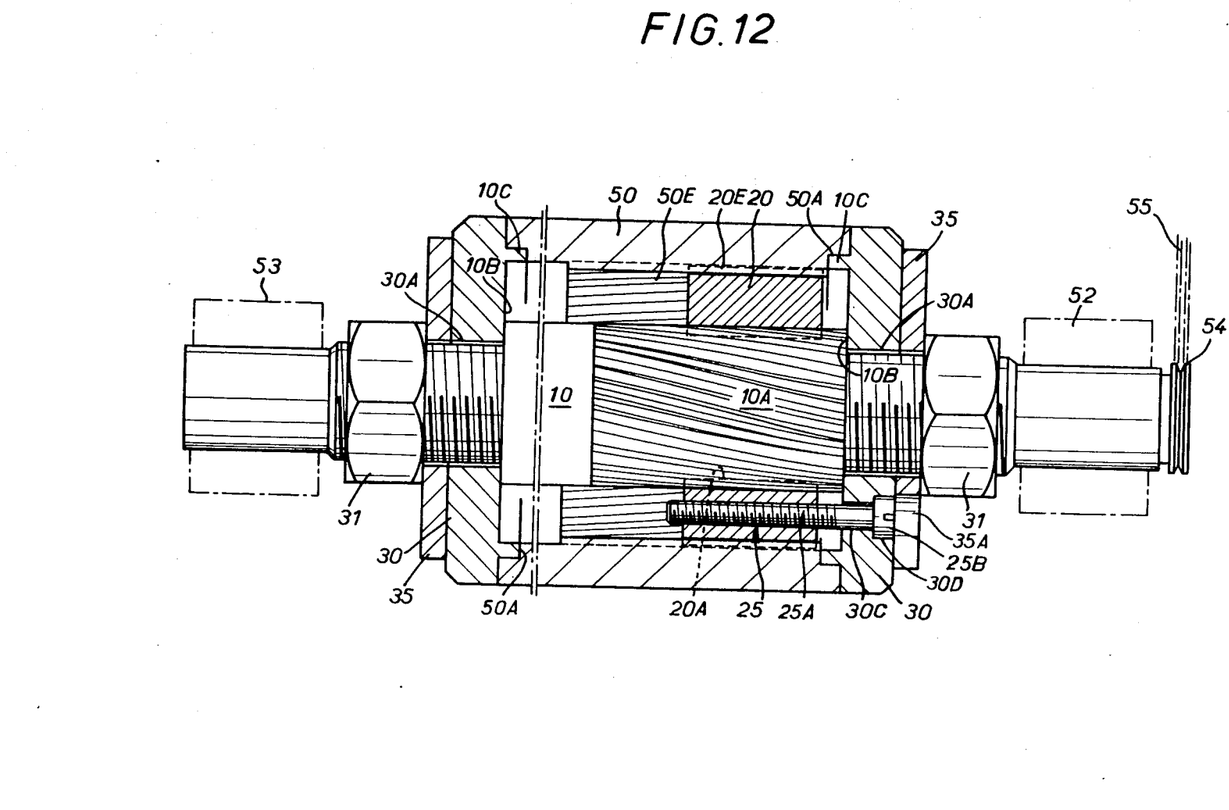
Figure 13:
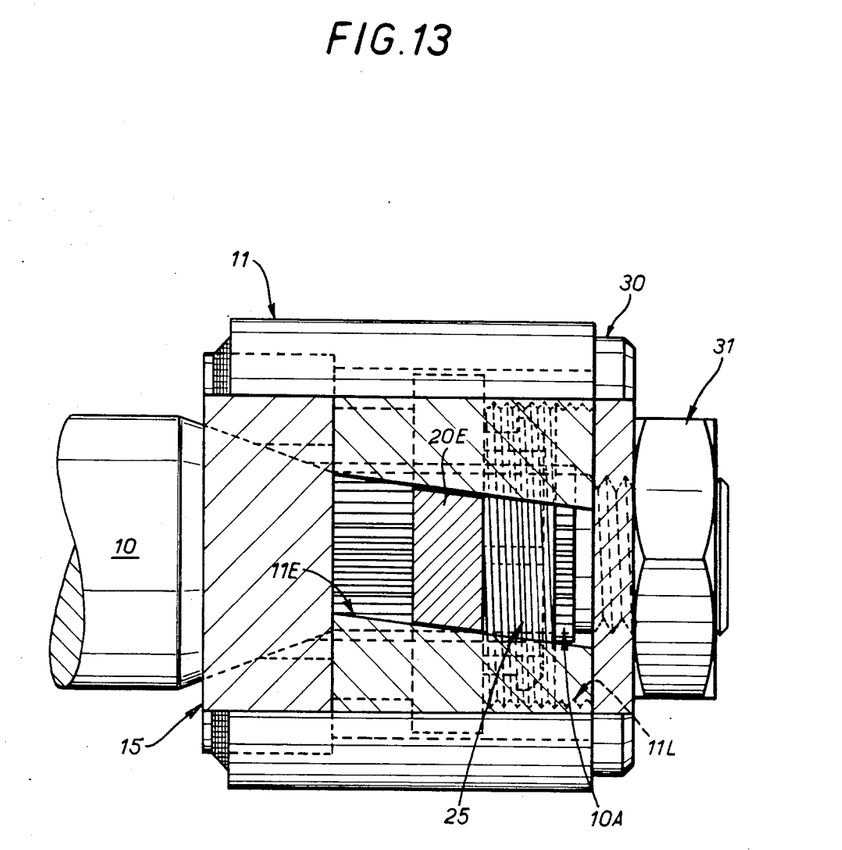
FIG. 13 is a longitudinal sectional view of the device of FIG. 1 showing the helical splines.

A device in accordance with the invention has other applications. In particular, it may be used to permit adjustment of the angular position of a roller constrained to rotate with a drive shaft as shown in FIG. 12. In this embodiment the roller 50 is contrained to rotate with a drive shaft 10 the end parts of which are mounted in bearings 52, 53, the shaft 10 carrying beyond one of the bearings, in this instance the bearing 52, a toothed wheel 54 which meshes with a transmission 55.

Towards one end the drive shaft 10 comprises a section whose outside surface features helical splines 10A meshing with complementary splines 20A formed on the inside surface of the ring 20, whereas the outside surface of said ring comprises helical splines 20E meshing with complementary splines 50E formed on a section of the inside surfacce of the roller. In this example, the two couplings thus constituted comprise splined surfaces the splines of which are in opposite directions.

The roller 50 is immobilized axially and transversally on the drive shaft 10 by any appropriate means. In the example shown, two clamping plates 30 engaged on the drive shaft by virtue of passages 30A bear on shoulders 10B formed on the drive shaft 10, whereas a circular rib 10C formed on the inside surface of the clamping plates is adapted to interlock in a corresponding end groove 50A formed in the roller.

In this way, this roller 50 is axially and transversally immobilized relative to the drive shaft 10. In the same way as in the embodiments described with reference to FIGS. 9 through 11, one of the clamping plates 30 comprises a passage 30C and a housing 30D for the installation and association of the screw 25 with the ring 20 to bring about displacement in translation of the latter.

The screw 25 is immobilized axially by the washer 35 which comprises a hole 35A providing access to the screw when, of course, the hole in question is brought into line with the head 25B of the latter.

Nuts 31 screwed onto the drive shaft fasten together the various components. The angular position of the roller 50 relative to the drive shaft 10 is adjusted after unscrewing at least one of the nuts 31, by turning the control screw 25. The respective couplings of the ring 20 to the drive shaft 10 and of the ring 20 to the roller, being formed by inclined helical splines in opposite directions, provide on the one hand for absorbing a high torque without the ring 20 tending to be displaced in the axial direction and, on the other hand, for obtaining an angular displacement of the roller 50 which is twice that for couplings comprising only one series of helical splines.

It will be understood that the invention is not limited to the embodiments described and shown, which are susceptible to be modified in various ways without departing from the scope of the invention.

What I claim is:

1. A device for adjusting the angular position of a driving member defining a steering wheel hub and a driven member defining a steering shaft, said device comprising a ring disposed annularly between said driving member and said driven member and having inner and outer spline means cooperating with complementary means on said driving member and said driven member, a selected one of said spline means and the associated complementary means being of a helical configuration, an annular threaded member coaxial with said driving and driven members cooperable with said ring and said driving member for axially displacing said ring and thereby angularly adjusting the position of said driving member and driven member relative to each other, and releasable means for normally maintaining said driving member and said driven member against relative angular displacement.

2. A device according to claim 1, wherein the selected one of said spline means is said outer spline means, said inner spline means comprising straight splines.

3. A device according to claim 1, wherein detent means releasably connect said ring for axial displacement with said annular threaded member.

4. A device according to claim 3, wherein said detent means comprises an axial pawl extending from said ring and an inwardly opening groove on a radially inner surface of said annular threaded member, a portion of said detent means being interlocked with said groove.

5. A device according to claim 1, wherein said annular threaded member has circumferentially spaced zones on an end surface facing away from said ring cooperable with a tool adapted to turn said annular threaded member.

6. A device according to claim 1, wherein said releasable means for normally holding said driving member and said driven member against relative angular displacement comprises complementary frustoconical surfaces on said driving member and said driven member and means for urging said frustoconical surfaces against each other.

7. A device for adjusting the angular position of a driving member defining a steering wheel hub and a driven member defining a steering shaft, said device comprising a ring disposed annularly between said driving member and said driven member and having inner and outer spline means cooperating with complementary means on said driving member and said driven member, a selected one of said spline means and the associated complementary means being of a helical configuration, a threaded member parallel to axes of said driving and driven members cooperable with said ring and said driving member for axially displacing said ring and thereby angularly adjusting the position of said driving and driven members relative to each other, and releasable means for normally holding said driving member and said driven member against relative angular displacement.

8. Device according to claim 7, wherein said threaded member comprises a control screw offset relative to axes of said driving and driven members.

9. Device according to claim 8, wherein the control screw is inserted into a cylindrical space formed by two longitudinal half-housings respectively formed on an outside surface of said ring and an inside surface of such driving member, said screw simultaneously forming a key, being immobilized axially by engagement of its head in a groove formed in said driving member whereas its threaded section is engaged with a threaded section of the half-housing formed in the ring.

10. Device according to claim 9, wherein at least a second key also couples said ring to the driving member which is diametrically opposite the first mentioned key and is displaceable within a straight groove, said selected one of said spline means being said inner spline means.

11. Device according to claim 10, wherein said outer spline means comprises straight splines.

12. Device according to claim 10, wherein an end on the control screw opposite its head is inserted in a passage in a clamping plate having a central hole for engagement over a free end part of said driven member.

13. Device according to claim 12, wherein said control screw has its threaded section engaged in a threaded passage formed in said ring and a head bearing against a housing formed in said clamping plate.

14. Device according to claim 13, wherein said selected one of said spline means is said outer spline means, said inner spline means being straight splines.

15. Device according to claim 13, wherein said selected one of said spline means is said outer spline means, said complementary means associated with said outer spline means comprising a radial stud projecting inwardly of said driving member.

16. Device according to claim 15, wherein the radial stud is formed at an end of a screw inserted radially into said driving member.

* * * * *